United States Patent [19]
Wall

[11] Patent Number: 5,113,464
[45] Date of Patent: May 12, 1992

[54] METHOD OF PRODUCING AN OPTICAL FIBER TERMINUS FOR HIGH TEMPERATURE USE

[75] Inventor: Stephen W. Wall, Costa Mesa, Calif.

[73] Assignee: Hughes Aircraft Company, Los Angeles, Calif.

[21] Appl. No.: 720,045

[22] Filed: Jun. 24, 1991

[51] Int. Cl.$^5$ .............................................. G02B 6/36
[52] U.S. Cl. ..................................... 385/81; 385/78; 385/85
[58] Field of Search ............... 350/96.20, 96.21, 96.22, 350/96.23, 96.18; 385/81, 53, 76, 77, 78, 85

[56] References Cited

U.S. PATENT DOCUMENTS

| | | | |
|---|---|---|---|
| 4,759,601 | 7/1988 | Knutsen et al. | 350/96.18 X |
| 4,941,727 | 7/1990 | Maranto et al. | 350/96.20 |
| 5,033,808 | 7/1991 | Smith et al. | 350/96.20 |

*Primary Examiner*—John D. Lee
*Assistant Examiner*—Phan T. Heartney
*Attorney, Agent, or Firm*—Terje Gudmestad; Wanda K. Denson-Low

[57] ABSTRACT

A fiber optic terminus is provided in which a deformable material (37), such as an elastomer, is compressed and grips an optical fiber (34) along a substantial length of a terminus body (10). In accomplishing this, an opening (15, 16, 18) in a front terminus body (10) receives a liquid material (37) which can be cured to a solid consistency. An optical fiber (34) then is extended through an opening (24, 25, 26) in a rear terminus body (20) and through the passageway (15, 16, 18) in the front terminus body (10), emerging at the forward end of the latter. The rear terminus body (20) then is forced a short distance into the passageway (15) in the front connector body (10) and the material (37) is cured to a solid consistency. After this, the rear connector body (20), which has a press fit within the passageway (15), is moved to a second position causing compression of the material (37) in the passageway (15, 16, 18) so that it grips the optical fiber (34).

11 Claims, 2 Drawing Sheets

METHOD OF PRODUCING AN OPTICAL FIBER TERMINUS FOR HIGH TEMPERATURE USE

BACKGROUND OF THE INVENTION

1. Field of the Invention

The field of this invention is that of optical fiber connectors and is particular to the retention of an optical fiber in a terminus.

2. Description of Related Art

In the design of optical fiber connectors, the connection of a fiber in a terminus has presented various difficulties. In such a connection it is necessary to hold the fiber securely without damaging the fiber or creating an incorrect orientation of the fiber relative to the terminus body. For full service capability, the fiber should be retained over a wide temperature range, including elevated temperatures. There should be the ability to compensate for temperature changes which the connector may encounter. In addition, the terminus should be capable of economical manufacture and be of uncomplicated construction.

Through one approach, an adhesive is used to hold an optical fiber within a terminus body. The adhesives used for this purpose have only limited tolerance for temperature changes and typically fail at elevated temperatures which many connectors may encounter. The retention force on the fiber also could be improved.

When crimping against an optical fiber to hold it within a terminus body, the retention force may be localized which can cause damage to the optical fiber. The position of the fiber can be altered such that the fiber will not align properly and the efficiency of light transmission suffers. Retention forces may not be adequate to retain the fiber under all conditions and temperature compensation may not be possible. In some designs, the complexity of springs to allow dimensional changes with temperature variations becomes necessary.

SUMMARY OF THE INVENTION

The present invention provides an improved arrangement for attaching a fiber to a terminus body overcoming the difficulties of the prior art. The fiber is retained securely without damage and temperature extremes may be encountered without loss of retention force. The construction is simple and the terminus can be produced economically.

The fiber retention system of this invention makes use of a deformable material occupying substantially the entire length of the optical terminus body, which is compressed so as to be forced against the optical fiber along its length to frictionally retain the fiber. A material may be selected which will withstand high temperatures.

In producing the optical fiber connector a front optical terminus body is constructed as an elongated tubular element having a restricted opening at its forward end, generally complementary to the periphery of the bare optical fiber. The remainder of the passageway is of larger diameter than the optical fiber. A deformable material is introduced into the passageway so as to fill most of it. Preferably this material is a viscous liquid which can cure to a solid material capable of withstanding high temperatures. An elastomer such as a silicone rubber is an example of such a material. The liquid may be introduced into the passageway in the front terminus body by a syringe.

An optical fiber, with the buffer stripped from its end, then is fed through a rear terminus body and through the passageway in the front body to emerge from the front end of the latter terminus body. The rear body then is forced into the rearward end of the passageway in the front body where it engages the wall of the passageway with a press fit. The rear body is advanced only a short distance into the passageway initially. After this, the material in the passageway is cured to a solid condition. When the material is heat-curable, the application of heat is provided.

After the cure, the rear body is forced longitudinally further into the passageway to a second position, exerting a force on the deformable material in the passageway such that this material tightly grips the optical fiber throughout a major portion of the length of the passageway. This secures the fiber to the terminus body with the force being distributed over a great length in the passageway in the front connector body. Damage to the fiber is avoided. The material in the passageway may be selected to withstand variations in temperature so that the retention force will be adequate under all service conditions. When temperature changes occur, the material can act as a spring and compensate for the small dimensional variations caused by the temperature change.

DESCRIPTION OF THE PREFERRED EMBODIMENTS

Figure 1:
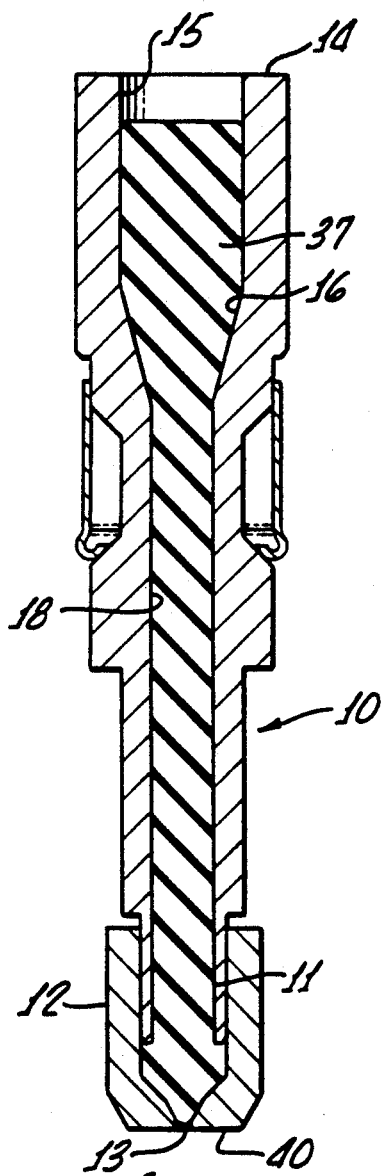
FIG. 1 is a longitudinal sectional view of a front optical terminus body into which has been introduced a viscous liquid which can cure to a solid deformable material.

The front body 10 of an optical fiber terminus, shown in FIG. 1, is an elongated tubular element, exteriorly contoured to cooperate with the other components of an optical fiber connector. The forward end portion 11 of the front body 10 has a relatively small exterior diameter and is received within an end bushing 12 with a press fit. Interiorly, the forward end of the bushing 12 tapers to a relatively small bore 13, which is generally complementary to the periphery of an optical fiber from which the buffer has been removed.

A bore extends through the front body 10 from the rearward end 14 to the forward end at the bushing 12. The portion 15 of the bore leading inwardly from the rearward end 14 is cylindrical and of relatively large diameter. A frustoconical wall 16 connects to the inner end of the bore portion 15, extending to a relatively narrow cylindrical passageway 18 that is longer than the portions 15 and 16 and occupies the remainder of the front body 10. The bore portion 18 is larger than the opening 13 through the bushing 12, being of greater diameter than an optical fiber that includes its buffer coating.

Figure 2:
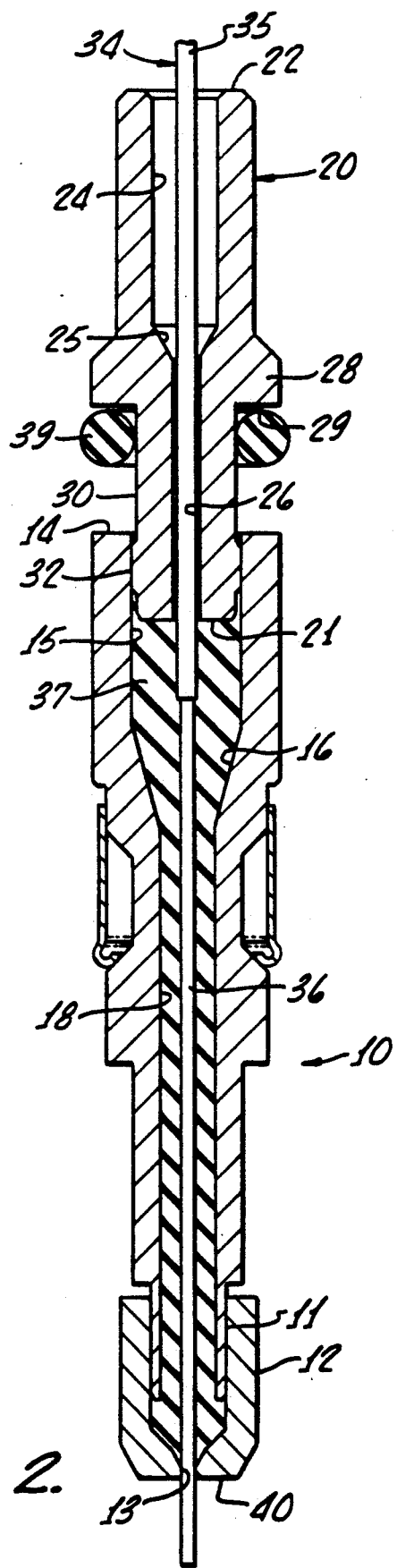
FIG. 2 is a longitudinal sectional view of the front and rear terminus bodies with the rear body advanced to its first position in the front body.

The terminus also includes a rear body 20, seen in FIG. 2, which is shorter than the front body. A bore extends through the rear body between its forward end 21 and its rearward end 22. The portion 24 or the bore extending inwardly from the rearward end 22 is of relatively large diameter. This part of the bore connects, through a frustoconical surface 25, to the forward portion 26 of the bore which is considerably smaller. The bore portion 26 has a diameter slightly larger than that of an optical fiber.

Exteriorly, the rear connector body 20 includes an enlarged flange portion 28 at one end of which is a forwardly facing radial shoulder 29. The exterior circumferential surface 30 that extends from the shoulder 29 to the forward end 21 is of relatively small diameter. This surface is interrupted near the forward end 21 by a portion 32 of slightly larger diameter. The diameter of the portion 32 is such that it can enter the rearward bore portion 15 of the front body 10 with a press fit.

The optical fiber 34 to be associated with the terminus is prepared by stripping the buffer 35 from one end portion of the fiber. The bare fiber 36 at that end and a portion of the buffer 35 then are cleaned.

A material 37 is introduced into the bore in the front body 10, substantially filling it. The material 37 is in liquid form, but is of a nature such that it will cure to a solid deformable material. Preferably the cured material 37 possesses resilience such as that of a resilient elastomer. When the optical fiber connector is to be subjected to variations in temperature a material 37 should be selected which will maintain its properties throughout the anticipated temperature range. It is possible to select a material that will withstand elevated temperatures so that the optical fiber connector can be subjected to an environment having higher temperatures than those which can be withstood by a connector of conventional design. The material 37 may be, for example, a heat curable silicone rubber of approximately 35 duromaters when cured. Such a material may have an operating temperature range of $-55$ degrees Centigrade to $+200$ degrees Centigrade.

In its liquid form, the material 37 may be injected into the front body 10 with a syringe. Because of its high viscosity the liquid material 37 will not run out of the body 10 through the opening 13 in the front bushing 12. Enough liquid material 37 is introduced to substantially fill the passageway through the front connector body 10, as seen in FIG. 1.

An O-ring 39 is positioned around the cylindrical surface 30 of the rear connector body 20 adjacent the radial shoulder 29. The cleaned end of the optical fiber 34 is extended through the passageway in the rear connector body 20 from the rearward end 22 to the forward end 21. The optical fiber end then is fed through the passageway in the front connector body 10 from the rearward end 14 so as to emerge through the aperture 13 and project a short distance beyond the end face 40 of the bushing 12. Although the material 37 is viscous it can be displaced readily to permit the fiber 34 to be pushed through the front connector body.

After this, the forward end of the rear connector body 20 is inserted into the passageway 15 at the rearward end of the front connector body. As this occurs the surface 32 near the forward end 21 of the rear connector body 20 makes a press fit with the wall of the passageway 15 in the front connector body 10. The rear connector body 20 is advanced forwardly in the front body 10 a short distance longitudinally to assure an absence of any significant voids in the material 37. This position is shown in FIG. 2 and will be retained frictionally because of the press fit of the rear body into the front body. As the rear body 20 is moved to this position some of the material 37 may be displaced rearwardly around the fiber 34 through the passageways 26, 25 and 24 in the rear body. The presence of the fiber 36 in the opening 13 blocks extrusion of the material 37 through that opening.

The material 37 then is cured to a solid consistency. For a heat-curable material the assembly is subjected to an elevated temperature sufficient to effect the curing.

Figure 3:
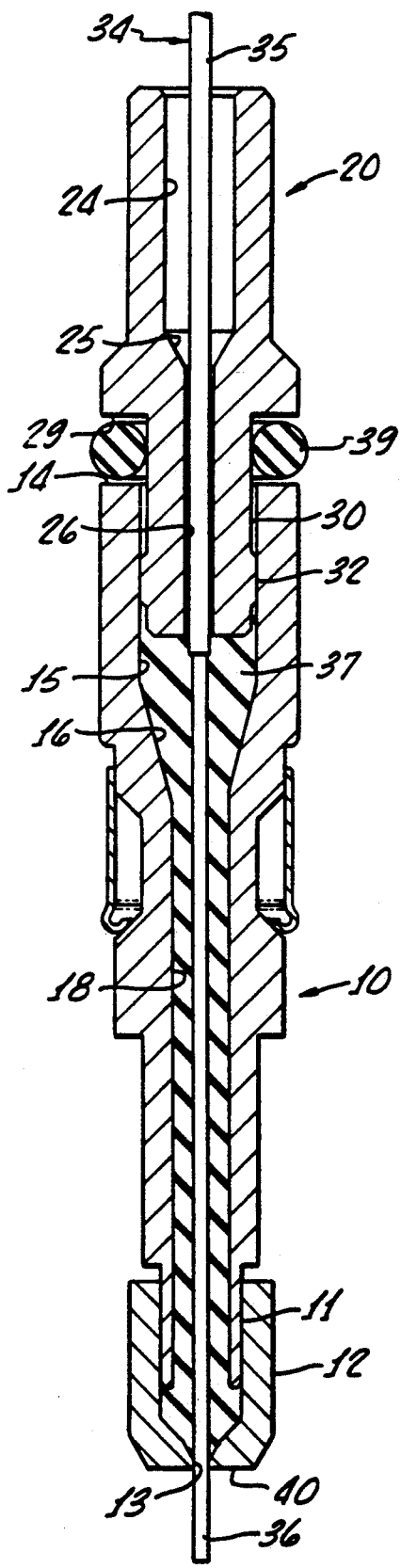
FIG. 3 is a view similar to FIG. 2 but with the rear body advanced to its second position.
Figure 4:
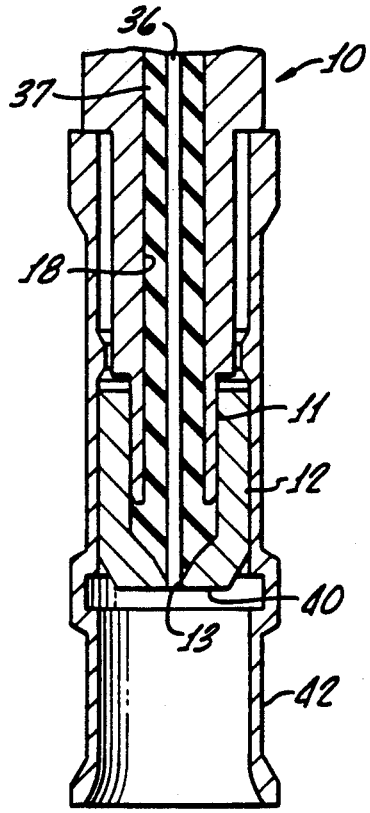
FIG. 4 is a fragmentary longitudinal sectional view of the forward end portion of a completed terminus.

After the curing of the material 37 is complete, the rear connector body 20 is pushed further into the front connector body 10 to its final position shown, in FIG. 3. By virtue of the press fit in the passageway 15, the rear connector body 20 will be retained in this position. The forward movement of the rear connector body 20 causes it to exert a compressive force on the material 37. This causes the material 37 to exert an equal force against the connector body and the optical fiber 34. As a result, the fiber 34 is gripped securely along most of the length of the passageway through the front connector body 10. This force is uniform throughout the length of the optical fiber engaged by the material 34 and is the same on the buffer 35 as on the bare fiber 36. This creates a high frictional force locking the optical fiber to the terminus. There are no localized stress concentrations with the uniformly applied force against the fiber, which avoids damage to the fiber or undesired movement of it.

To complete the terminus, the protruding end of the bare fiber 36 is severed and it is ground and polished flush with the end face 40 of the bushing 12. To construct a socket terminus, a socket sleeve 42 is fitted over the forward end portion of the front connector body 10 to provide a socket opening beyond the end face 40 of the front bushing 12. For a pin terminus, of course, the sleeve 42 is omitted.

The optical fiber 34 will be retained in the terminus over a wide range of temperatures reflecting the temperature range of the material 37 selected, which can be far greater than that of adhesives normally used. As temperatures change and expansion or contraction occurs the material 37 will act as a spring compensating for the minute dimensional changes encountered. No auxiliary spring is needed.

The foregoing detailed description is to be clearly understood as given by way of illustration and example only, the spirit and scope of this invention being limited solely by the appended claims.

What is claimed is:

1. The method of securing an optical fiber to an optical fiber terminus comprising the steps of:

forming an optical terminus body having a forward end and a rearward end and a passageway extending between said forward end and said rearward end, the major portion of said passageway being of greater lateral dimension than the diameter of an optical fiber to be secured, introducing into said passageway a liquid which can cure to a solid deformable material such that said liquid substantially fills said portion of said passageway, extending such an optical fiber through said passageway, curing said liquid to obtain a solid deformable material in said portion of said passageway, and then exerting a force on said material axially from said rearward end so as to create a reaction causing said material to grip said optical fiber in said portion of said passageway.

2. The method as recited in claim 1 in which for so exerting a force on said material a member is brought into engagement with said material adjacent said rearward end and biased toward said forward end so as to thereby exert such a force on said material.

3. The method as recited in claim 1 in which said passageway includes an additional relatively short portion adjacent said forward end which is substantially complementary to said optical fiber, whereby when said optical fiber is extended through said additional portion of said passageway said material is confined adjacent said forward end.

4. The method as recited in claim 3 in which said liquid is sufficiently viscous that it will not flow through said additional portion of said passageway when it is introduced into said passageway.

5. The method as recited in claim 1 in which said member is forced into said passageway adjacent said rearward end, said member being dimensioned so that it makes a press fit in said passageway, said member being moved longitudinally of said passageway to a predetermined position for so exerting a force on said material, and is retained in said predetermined position by friction resulting from said press fit.

6. The method as recited in claim 5 in which said member is forced into said passageway adjacent said rearward end after said liquid has been introduced into said passageway and prior to said curing of said liquid, and said member is advanced longitudinally in said passageway to a first position closer to said rearward end than said predetermined position and such that said liquid occupies substantially the entire volume of said passageway forwardly of said member.

7. The method of producing an optical fiber terminus comprising the steps of
   forming a front optical terminus body having a passageway therethrough from a rearward end to a forward end of said body,
   said passageway for the major part of its length having a greater diameter than the diameter of an optical fiber to be associated with the optical fiber terminus to be produced,
   said passageway adjacent said forward end being substantially complementary to said fiber,
   introducing into said passageway a quantity of liquid which can cure to a solid deformable material,
   forming a rear optical terminus body having a passageway therethrough from a rearward end to a forward end of said rear body,
   said rear body being formed so that its forward end can be forced into the rearward portion of said passageway in said front body with a press fit,
   extending said optical fiber through said passageway in said rear body and through said passageway in said front body,
   then so forcing said forward end portion of said rear body into said rearward end of said passageway in said front body to a first position longitudinally of said passageway in said front body,
   then curing said liquid so as to form said solid deformable material, and
   then so forcing said rear body into said rearward end of said passageway in said front body to a second position further within said passageway in said front body,
   thereby to exert a compressive force on said material so that said material frictionally grips said fiber along the major portion of the length of said passageway in said front body.

8. The method as recited in claim 7 in which said material is resilient.

9. The method as recited in claim 8 in which said material is an elastomer.

10. The method as recited in claim 7 in which when said rear body is in said first position there are substantially no voids in said material.

11. The method as recited in claim 7 in which when said fiber is so extended through said passageway in said front body a length of said fiber protrudes beyond said forward end of said front body, and including the step of severing said fiber adjacent said forward end of said front body after said rear body is so forced into said passageway and said front body to said second position and then grinding and polishing the end face of said fiber.

* * * * *